Oct. 25, 1966   S. CART   3,281,111
ROTATABLE FAUCET VALVE
Filed Dec. 6, 1963
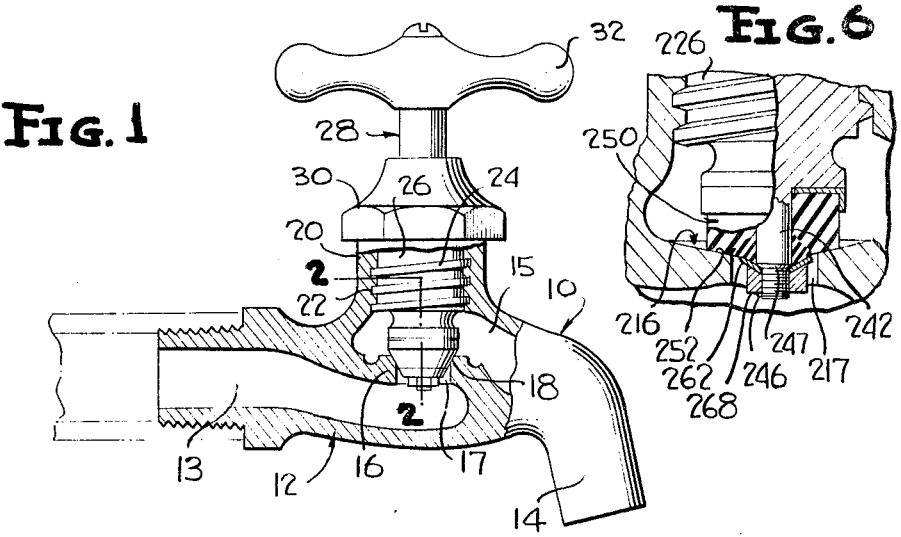
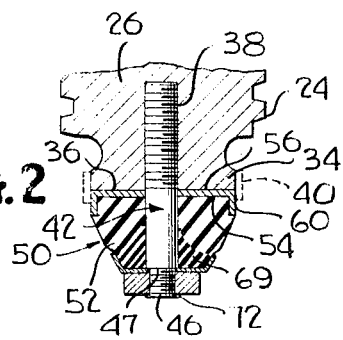
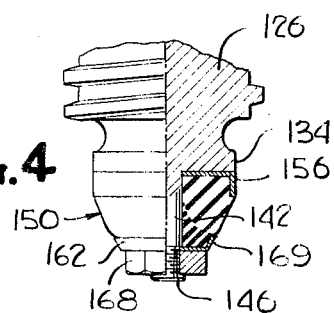
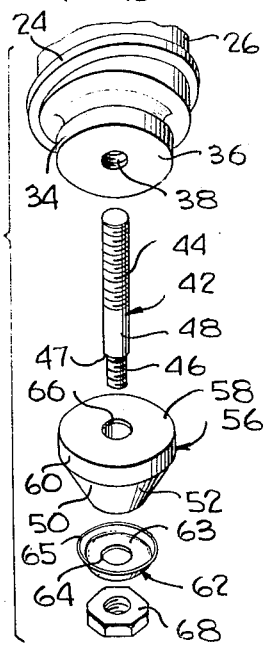
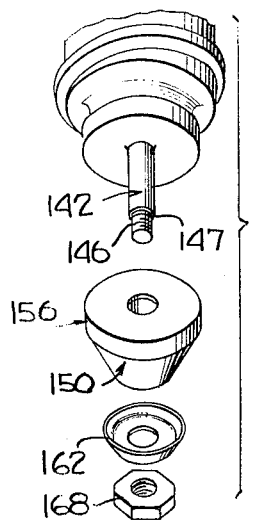
INVENTOR
SPENCER CART
BY *Shoemaker and Mattare*
ATTORNEYS

United States Patent Office 3,281,111
Patented Oct. 25, 1966

3,281,111
ROTATABLE FAUCET VALVE
Spencer Cart, 730 Pershing Ave., San Bernardino, Calif.
Filed Dec. 6, 1963, Ser. No. 328,662
6 Claims. (Cl. 251—88)

This invention relates to improvements in faucet valves.

In conventional valves of the type commonly referred to as faucet valves or valve cocks, a threaded rotary stem carries upon its inner end a valve washer. Rotation of the stem caused the same to move axially either toward or away from a seat and when the stem is rotated to move the valve washer to position against the seat, the valve washer, being firmly held in a cup on the end of the stem, or otherwise held so that it cannot move around the stem, is pressed on and turned against the surface of the seat. This, accordingly, causes wear of the valve material, which is usually a fiber composition or a rubber and fiber composition, and eventually the valve washer is worn to the point where it will no longer engage the seat with sufficient tightness to prevent the faucet from leaking.

Such faucet seats, also, are frequently of a form to present a flat face which lies in a plane perpendicular to the stem, to be engaged by a corresponding flat face of the washer and seats of this character frequently become corroded and there results a small groove across the seat which the flat washer cannot close. This also further results in wear and tear upon the washer.

The present invention has for a principal object to provide a new type of faucet valve which is designed in such a manner as to avoid the shortcomings of conventional type valves of the character described.

A more particular object of the invention is to provide an improved faucet valve wherein the seat engaging element is attached to the inner end of the stem in such a way as to permit it to remain stationary against the seat while the stem is rotated either to separate the valve element from the seat or to force it firmly into water tight engagement with the seat.

A still further object of the invention is to provide a faucet valve structure which is of simple design or construction and which may be manufactured as an original element of the faucet valve stem but which may be easily and quickly removed for cleaning or replacement by another element if and when such removal and replacement becomes necessary.

A still further object of the invention is to provide a novel faucet valve replacement kit which may be easily substituted for the present conventional fixed valve element maintained in position upon the inner end of the valve stem by a screw which is threaded into a bore in the inner end of the valve stem.

Generally the present invention comprises the combination with a rotary valve stem of a valve seat engaging seal element which is mounted upon an axial extension of the valve stem and which extension is in the form of a pin. Such seal element has a tapered, or frusto-conical, seat engaging surface and is mounted upon the valve stem extension or pin with the taper directed downwardly whereby the sloping conical surface of the seal element engages upon a seat in the body of the faucet in which the seat is inserted or threaded.

The pin extension of the valve stem may comprise an integral part of the stem, formed with the stem in the manufacture of the latter, or such pin extension may be in the form of a separate element having threaded end portions with an intermediate unthreaded portion. One of the threaded end portions is adapted for extension into the threaded bore which is found in the majority of conventional faucets to receive a washer securing screw, while the other threaded end portion of the pin receives a retaining nut. There is also placed on the other end portion of the pin between the seal element and the nut, a washer which is formed to conform to the taper of the seal element in such a way as to effect a compression or crimping of the seal element against the pin when the nut is drawn up to a predetermined position on the pin so as to slightly tighten the engagement of the seal element with the pin to an extent to prevent the passage of water or other liquid between the seal element and the pin, but such engagement is not tight enough to prevent relative rotation between the pin and the seal element when the latter is pressed on the seat of the faucet. Accordingly, it will be seen that another and important object of the invention is to provide a construction wherein the seal element is protected against excessive wear by being rotated against a seat, as is done in conventional faucet constructions and is also held in sufficiently close or tight engagement with the supporting pin to prevent leakage of water or other fluid past the seal element between the latter and the pin.

In the construction where the pin is initially formed integral with the stem of the faucet, only an outer end portion of this pin is threaded to receive the nut, the major portion of such integral stem being smooth so that the valve element may turn therearound.

The invention will be best understood from a consideration of the following detailed description taken in connection with the accompanying drawing, wherein:

FIG. 1 is a view partly in side elevation and partly in section of a faucet having a sealing element seat and showing the application thereto of one embodiment of a seal element constructed in accordance with the present invention.

FIG. 2 is a longitudinal section through the inner end of a valve stem of a type having a threaded axial bore in the inner end thereof and showing the application of a replacement kit or set constructed in accordance with the present invention, such section being taken substantially on the line 2—2 of FIG. 1;

FIG. 3 is an exploded view illustrating the various parts of the structure shown in FIG. 2;

FIG. 4 is a view partly in elevation and partly in longitudinal section corresponding to the section line 2—2 of FIG. 1, but illustrating the application of the valve unit or seal element to a pin on the inner end of the stem and formed integrally with the latter.

FIG. 5 is an exploded view illustrating the elements of FIG. 4.

FIG. 6 is a sectional view corresponding in part to FIG. 4 and illustrating another embodiment of the seal element constructed in accordance with the present invention.

Referring now more particularly to the drawing the numeral 10 generally designates a faucet structure in association with which the present invention is illustrated. The type of faucet structure shown is intended to be merely illustrative and not restrictive in any way with regard to its design or the use of the invention in association therewith. It is to be understood that the present invention may be used on or applied to any type of faucet or stop-cock having a valve seat of the proper form or shape to be engaged by and form a sealing engagement with the hereinafter described valve elements.

In the faucet structure 10 illustrated in FIG. 1, the numeral 12 designates the body of the faucet with the inlet passage designated 13 and the outlet passage leading to the discharge nozzle 14, designated 15.

Separating the passages is the usual partitioning means 16 having formed therethrough the port 17 and at the top end of the port there is formed the valve seat 18 of appropriate form for engagement by the seat element.

The numeral 20 designates the upstanding collar which is axially aligned with the port 17 and which is internally threaded as indicated at 22 for threaded engagement with the threads 24 carried by the body portion 26 of the valve stem 28.

The threaded body portion 26 is maintained against removal, in the usual manner, by the provision of the bonnet 30 and the upper end of the stem carries the handle or head 32 by which rotation of the stem is facilitated.

In FIGS. 2 and 3 the lower or inner end of the body portion 26 of the valve stem 28, is shown as being of reduced circular form, this reduced portion being designated 34.

The lower end of the body portion 26 is formed with the flat circular pressure face 36.

This flat surface or face 36 has opening therethrough, the lower end of the threaded bore 38 which extends axially in the body 26. This bore represents the threaded bore or passage which is conventionally found in faucets and which receives a screw for maintaining a flat disc washer in position against the lower end of the valve stem.

Conventional faucets, using flat valve discs may have a flange at the portion 34 of the body which projects beyond the face 36 as illustrated in dotted outline, at 40, and in the replacement of the conventional valve element with the replacement kit of the present invention this flange may be removed if desired although this may not be necessary so long as there is no interference between such flange and the valve element of the present invention.

In accordance with the present invention, in the form illustrated in FIGS. 2 and 3, there is provided a pin which is generally designated 42, which has a portion of one end threaded as indicated at 44. This pin is of a diameter in the threaded end portion 44 to be inserted in the threaded bore 38 in replacement of the usual washer securing screw. The opposite end of the pin 42 has a short threaded portion 46 forming the terminus of that end and this short terminal portion 46 is of reduced diameter whereby there is provided at the upper end of the threaded portion 46, the shoulder 47.

The numeral 50 designates a frusto-conical valve, or seal element, the tapered, circular seat engaging face of which is designated 52.

Between the threaded portions 44 and 46 the pin 42 which is circular, smooth or unthreaded as indicated at 48.

The numeral 54 designates the larger or base end of the frusto-conical element, which is seated in a friction cup 56, the bottom of which cup is designated 58 while the surrounding flange of the cup is designated 60. The flange 60 encircles the base portion of the element 50 as shown and the overall diameter of the cup is preferably not greater than the diameter of the circular face 36.

The numeral 62 designates a flanged cap in which the smaller end of the valve seal element 50 is positioned. This cap 62 has a bottom portion 63 in which is formed the opening 64 to receive the reduced end 46 of the pin 42 as shown in FIG. 2.

The bottom 63 of the cap merges with an upwardly and outwardly flaring flange 65. The angle of this flange with respect to the plane of the bottom 63 approximately corresponds to the angle of the seat engaging face 52 of the seal element, and the opening 64 is of smaller diameter than the central portion 48 of the pin whereby the cap, when in operative position, will seat against the shoulder 47.

The numeral 68 designates a threaded nut for application to the reduced threaded end portion 46 of the pin to bear against the underside of the cap 62 and move the cap into engagement with the shoulder 47 when the parts are assembled.

In the employment of the parts illustrated in FIGS. 2 and 3, which parts may be supplied to the purchasing public in the form of a pair or replacement kit for conventional faucets, the conventional valve element securing screw is removed together with the worn washer and the threaded end 44 of the pin is then threaded into the bore 38.

The seal element 50 has the axial passage 66 formed therethrough to receive the central portion 48 of the pin around which the seal element turns together with the cup 56 and the cap 62.

The axial length of the seal element and cup, from the top side of the cup to the lower end surface of the seal element which engages against the bottom 63 of the cap, is such that when the seal element is placed on the pin, after the pin has been threaded into position, the lower end of the seal element will extend slightly beyond the shoulder 47 of the pin. Thus, when the cap 62 is placed on the pin to receive the tapered lower end of the seal element and the nut 68 is applied and drawn up on the threaded reduced extension 46 of the pin the down into the cap or crimped and slightly compressed resilient material of the seal element will be squeezed in a substantial area along the pin as indicated at 69 so that a seal will be formed between the pin and the element 52 which will prevent fluid from passing up between the element and the pin. This compression is not, however, sufficiently great to prevent the turning of the seal element on the pin. It will be recognized, of course, that the shoulder 47 limits the extent to which the cap can be moved by the tightening nut 68.

It will be seen that when the stem 26 is threaded inwardly, carrying the replacement valve shown in FIG. 2, the conical portion of the element will enter the bore 17 and the tapered surface 52 will press on the valve seat 18. The stem and the pin 42 may then be rotated to force the element 50 tightly against the seat, without turning the element on the face of the seat.

In order to avoid the possibility of the nut 68 turning and possibly coming off of the stem portion 46, a suitable means may be employed for holding it against rotation as, for example, a small drop of solder, as indicated at 72 in FIG. 2 may be placed between the end of the stem and the nut. This will hold the nut against becoming loosened from the action of the water flowing thereacross or from vibration but the solder being soft, may be easily scraped away or forced off by forcibly reversing the rotation of the nut on the stem by means of a wrench or other suitable instrument if it should become necessary to remove the valve element.

In the form of the invention illustrated in FIGS. 4 and 5, the threaded body portion of the valve stem is designated 126. Here the inner end portion 134 is shown as having the pin 142 as an integral axial extension of the body portion 126. Only a short inner end portion of the stem is reduced in diameter and screw threaded as indicated at 146, to receive the retaining nut 168. This portion thus forms the shoulder 147.

Except for the fact of the pin 142 being initially manufactured as an integral part of the stem body 126, the elements of the valve are the same as described in connection with FIGS. 2 and 3. Accordingly no detailed description of such elements is considered necessary to an understanding of the invention in the form shown in FIGS. 4 and 5 except to identify the parts generally and thus the valve seal element itself is designated 150, the cup in which the base of the seal element is secured is designated 156 and the cap on the tapered or smaller end of the element is designated 162.

In this second embodiment it will be seen that when the seal element, with the cup 156 is compressed between the cap 162, the material of the seal element will be crimped or squeezed in against the pin 142 as indicated at 169.

FIG. 6 illustrates another embodiment or form of the invention wherein the seat engaging surface of the seal element is only slightly tapered or more nearly approaches a flat condition to engage upon a seat which may be flat or only very slightly tapered as shown. This third embodiment of the invention is shown applied to a stem 242 which is an integral part of the body portion 226 of the faucet structure and also in this view the valve seat which is designated 216 is shown with only a slight taper and the opening or port through the seat is designated 217. It will, of course, be readily apparent that with the form of the valve seal element shown, the seat 216 could be a flat surface rather than slightly tapered and the seal element would still function effectively.

The seal element shown in FIG. 6 is generally designated 250 and the frusto-conical seat engaging face is designated 252.

The stem 242 is reduced at its free end as indicated at 246, thereby forming the shoulder 247.

The cap 262 is of tapered or substantially conical form and when pressed into position to compress the seal element in the manner illustrated and as described in connection with the other seal elements, its upward movement on the stem under the action of the nut 268, is limited by its contact with the shoulder 247. Thus as the seal element is forced into the hollow side of the cap, it will be crimped or compressed inwardly against the stem to obtain the fluid tight seal between the axial passage through the seal element and the stem without, however, forming a sufficiently tight engagement with the stem to prevent relative rotation of the seal element relative to the stem.

In this latter construction as well as in the construction shown in FIG. 4, rotation of the nut on the threaded reduced portion of the stem can be prevented in a suitable manner, as, for example, by the employment of a drop of solder, as previously stated, and as indicated at 146 in FIG. 4 and at 246 in FIG. 6.

It will be seen in connection with the foregoing that the crimping action and the consequent fluid tight engagement between the stem and the seal element is dependent upon the cooperation of the cap and the tapered lower end portion of the seal element whereby when the seal element is forced into the cap in the manner described, it will be lightly compressed around the stem.

A taper of the seat engaging surface or end of the seal element of not less than 30° is essential, although the greater taper may be employed without impairing the operation, as is illustrated by the embodiments shown in FIGS. 2 and 4.

From the foregoing it will be seen that there is provided by the present invention a simple yet efficient valve unit wherein the valve element will not be worn away or destroyed by being turned against friction with a valve seat and thus a tight leakproof engagement can be maintained with a valve seat over a long period and a fluid tight seal will be formed between the seal element and the stem about which it turns. If renewel of the valve element should become necessary as might be the case where it becomes water worn or breaks down through contact with excessively hot water, the element can be easily and quickly renewed merely by removing the holding nut 68 or 168 and slipping a new element onto the pin which forms the extension of the valve stem.

As will be readily apparent and as previously stated, the parts illustrated in FIG. 3 may be sold as a unit and if the faucet stem is of the type which has a flange, such as that indicated at 40 in FIG. 2, this flange may be filed away if desired, particularly in the event that it may be of smaller diameter than the cup 56. The replacement unit may then be installed and the cup part 56, of the element 50 will then bear against the face 36 when the valve is seated and the stem 28 is rotated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A faucet valve comprising a valve stem having a lower end portion threaded for coupling with a faucet body for reciprocation relative to a valve seat, said lower end portion having a flat circular bearing surface, a pin member carried rigidly by said stem and extending from said bearing surface axially of said stem, a compressible valve seal element having an upper end and having a tapered lower end surface for engagement against said valve seat, said valve seal element having an axial bore therethrough through which said pin member extends, a bearing cup opposing said upper end of said valve seal element and engaging said bearing surface, said bearing cup having a portion closely enclosing said upper end of said bearing seal member, said pin member having a smooth portion and reduced lower end portion forming a shoulder, said lower end portion being screw threaded, a substantially rigid circular member having a central aperture and having said threaded end portion of said pin extending therethrough, said rigid circular member being adapted to engage said shoulder, said rigid circular member being formed to receive and enclose a portion of said tapered lower end of said valve seal element, and means threaded on said screw threaded end portion of said pin and maintaining said valve seal element compressed between said substantially rigid circular member and said bearing cup with the surface of said axial bore in fluid tight sealing engagement with said pin, while allowing rotation of the pin in said bore.

2. The invention according to claim 1, wherein said pin forms an integral part of the valve stem.

3. The invention according to claim 1, wherein said pin is screw threaded above the said smooth portion thereof and extends into a tapped and threaded axial bore in the valve stem.

4. The invention according to claim 1, wherein the said form of said rigid circular member is that of a frusto-conical cap having a bottom portion merging into an upwardly and outwardly extending flange.

5. The invention according to claim 1, wherein the said form of said rigid circular member is that of a frusto-conical cap having an upwardly and outwardly extending side, and said threaded means is a nut having a top formed to receive the lower portion of said frusto-conical cap.

6. A repair assembly for replacement of a faucet valve of a type wherein a valve element is secured by a screw threaded into a bore in the inner end of a valve stem, said assembly consisting of a pin relatively long as compared with the said screw which it is to replace, the pin having one threaded end portion for engagement in the said valve stem bore and having a portion of its other end reduced to form a shoulder and the reduced portion being threaded, a valve seal element having an axial passage to receive said intermediate portion of the pin and having a tapered inner end seat engaging surface, a cup member having the other end of the seal element therein and having an aperture registering with said passage, a cap member formed with a bottom and an outwardly flaring rim to receive at least a portion of said tapered inner end surface of the element and having an aperture for registry with said passage when applied to the tapered end of said seal element, and a nut for threaded engagement on the said reduced other end of said pin, the said cap when applied to said reduced end of the pin being adapted to be pressed against said shoulder by said nut.

References Cited by the Examiner
UNITED STATES PATENTS

| | | | |
|---|---|---|---|
| 1,482,021 | 1/1924 | Little | 251—88 X |
| 2,128,351 | 8/1938 | Cornelius | 251—357 X |
| 2,277,251 | 3/1942 | Palmer | 251—88 |
| 2,784,732 | 3/1957 | Nurkiewicz | 251—357 X |
| 2,978,220 | 4/1961 | Morsch | 251—88 |

M. CARY NELSON, *Primary Examiner.*

R. C. MILLER, *Assistant Examiner.*